(12) United States Patent
Weller et al.

(10) Patent No.: US 11,760,652 B2
(45) Date of Patent: Sep. 19, 2023

(54) SYNTHESIS OF LITHIUM LANTHANUM ZIRCONATE FROM NANOCRYSTALLINE LANTHANUM ZIRCONATE

(71) Applicants: Jon Weller, Phoenix, AZ (US); Candace Chan, Phoenix, AZ (US)

(72) Inventors: Jon Weller, Phoenix, AZ (US); Candace Chan, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 57 days.

(21) Appl. No.: 17/396,967

(22) Filed: Aug. 9, 2021

(65) Prior Publication Data

US 2021/0371296 A1 Dec. 2, 2021

Related U.S. Application Data

(62) Division of application No. 16/399,331, filed on Apr. 30, 2019, now Pat. No. 11,084,734.

(Continued)

(51) Int. Cl.
*C01G 25/02* (2006.01)
*C01G 25/00* (2006.01)
(Continued)

(52) U.S. Cl.
CPC .......... *C01G 25/006* (2013.01); *C08K 5/053* (2013.01); *C08K 5/09* (2013.01); *C08L 29/14* (2013.01);
(Continued)

(58) Field of Classification Search
None
See application file for complete search history.

(56) References Cited

U.S. PATENT DOCUMENTS

| 8,906,551 B2 | 12/2014 | Chan |
| 9,590,247 B2 | 3/2017 | Chan |

(Continued)

FOREIGN PATENT DOCUMENTS

| CN | 104332651 A | 2/2015 |
| CN | 105406117 A | 3/2016 |

(Continued)

OTHER PUBLICATIONS

Deviannapoorani, C, et al. "Synthesis of lithium garnets from La2Zr2O7 pyrochlore". Solid State Ionics. 283, 123-130 (2015). (Year: 2015).*

(Continued)

*Primary Examiner* — Sheng H Davis
(74) *Attorney, Agent, or Firm* — Fish & Richardson P.C.

(57) ABSTRACT

Fabricating a layer including lithium lanthanum zirconate ($Li_7La_3Zr_2O_{12}$) layer includes forming a slurry including lanthanum zirconate ($La_2Zr_2O_7$) nanocrystals, a lithium precursor, and a lanthanum precursor in stoichiometric amounts to yield a dispersion including lithium, lanthanum, and zirconium. In some cases, the dispersion includes lithium, lanthanum, and zirconium in a molar ratio of 7:3:2. In certain cases, the slurry includes excess lithium. The slurry is dispensed onto a substrate and dried. The dried slurry is calcined to yield the layer including lithium lanthanum zirconate.

10 Claims, 14 Drawing Sheets

Related U.S. Application Data

(60) Provisional application No. 62/667,383, filed on May 4, 2018.

(51) Int. Cl.

| | |
|---|---|
| C08L 33/08 | (2006.01) |
| C08L 33/10 | (2006.01) |
| C08L 29/14 | (2006.01) |
| C08K 5/053 | (2006.01) |
| C08K 5/09 | (2006.01) |
| B82Y 40/00 | (2011.01) |

(52) U.S. Cl.
CPC .............. *C08L 33/08* (2013.01); *C08L 33/10* (2013.01); *B82Y 40/00* (2013.01); *C01P 2002/52* (2013.01); *C01P 2002/60* (2013.01); *C01P 2002/72* (2013.01); *C01P 2004/03* (2013.01); *C01P 2004/04* (2013.01)

(56) References Cited

U.S. PATENT DOCUMENTS

| | | | |
|---|---|---|---|
| 9,853,324 | B2 | 12/2017 | Chan |
| 10,128,488 | B2 | 11/2018 | Chan |
| 10,170,759 | B2 | 1/2019 | Seo |
| 10,858,263 | B2 | 12/2020 | Weller et al. |
| 11,053,134 | B2 | 7/2021 | Weller et al. |
| 11,268,196 | B2 | 3/2022 | Chan et al. |
| 2010/0047696 | A1 | 2/2010 | Yoshida |
| 2011/0053000 | A1* | 3/2011 | Kanamura .............. C01D 15/02 501/134 |
| 2012/0196189 | A1 | 8/2012 | Babic et al. |
| 2013/0344416 | A1 | 12/2013 | Sakamoto |
| 2014/0072870 | A1 | 3/2014 | Otsuka |
| 2014/0186720 | A1 | 7/2014 | Kintaka |
| 2015/0130115 | A1 | 5/2015 | Sung |
| 2015/0180001 | A1 | 6/2015 | Johnson et al. |
| 2016/0141605 | A1 | 5/2016 | Chan |
| 2016/0248118 | A1 | 8/2016 | Chan |
| 2016/0293988 | A1 | 10/2016 | Sakamoto |
| 2017/0155169 | A1 | 6/2017 | Hitz |
| 2018/0034054 | A1 | 2/2018 | Chan |
| 2018/0362360 | A1 | 12/2018 | Chan et al. |
| 2018/0375149 | A1* | 12/2018 | Beck ................. H01M 10/0562 |
| 2019/0062176 | A1 | 2/2019 | Weller |
| 2019/0337817 | A1 | 11/2019 | Weller |
| 2020/0131643 | A1 | 4/2020 | Chan |
| 2021/0230013 | A1 | 7/2021 | Weller et al. |
| 2021/0403340 | A1 | 12/2021 | Weller et al. |
| 2022/0186380 | A1 | 6/2022 | Chan et al. |

FOREIGN PATENT DOCUMENTS

| | | |
|---|---|---|
| WO | WO2013158307 A1 | 10/2013 |
| WO | WO2013192417 A1 | 12/2013 |
| WO | WO2014134350 A1 | 9/2014 |
| WO | WO2014205381 A1 | 12/2014 |
| WO | WO2015006010 A2 | 1/2015 |
| WO | WO2015038735 A1 | 3/2015 |
| WO | WO2015006010 A9 | 7/2015 |

OTHER PUBLICATIONS

Murugan et al., "Fast Lithium Ion Conduction in Garnet-Type Li7La3Zr2O12," Angew. Chem., Int. Ed., 2007, 46:7778-7781. https://doi.org/10.1002/anie.200701144.

Nisula et al., "Atomic Layer Deposition of Lithium Phosphorus Oxynitride," Chem. Mater., 2015, 27(20):6987-6993, https://doi.org/10.1021/acs.chemmater.5b02199.

Ohta et al. "High Lithium Ionic Conductivity in the Garnet-Type Oxide Li7 XLa3(Zr2 X,NbX)O12 (X=0-2)," J. Power Sources, 2011, 196:3342-3345.

Pearse et al., "Three-Dimensional Solid-State Lithium-Ion Batteries Fabricated by Conformal Vapor-Phase Chemistry," ACS Nano, 2018, 12:4286-4294, https://doi.org/10.1021/acsnano.7b08751.

Putkonen ct al., "Atomic Layer Deposition of Lithium Containing Thin Films," J. Mater. Chem., 2009, 19(46):8767, https://doi.org/10.1039/b913466b.

Putkonen et al., "ZrO2 Thin Films Grown on Silicon Substrates by Atomic Layer Deposition with Cp2Zr(CH3)2 and Water as Precursors," Chem. Vap. Depos., 2003, 9(4):207-212, https://doi.org/10.1002/cvde.200306254.

Rahman et al., "Basic Molten Salt Process—A New Route for Synthesis of Nanocrystalline Li4Ti5O12—TiO2 Anode Material for Li-Ion Batteries Using Eutectic Mixture of LiNO3—LiOH—Li2O2," J. Power Sources, 2010, 195:4297-4303.

Ramakumar et al., "Lithium Garnets: Synthesis, Structure, Li+ Conductivity, Li+ Dynamics and Applications," Prog. Mater. Sci., 2017, 88:325-411.

Rangasamy et al., "The Role of Al and Li Concentration on the Formation of Cubic Garnet Solid Electrolyte of Nominal Composition Li7La3Zr2O12," Solid State Ionics, 2012, 206:28-32.

Reddy et al., "Molten salt synthesis and characterization of fast ion conductor Li6.75La3Zr1.75Ta0.25O12," J. Solid State Electrochem, 2017, (21):2921-2928.

Sakamoto et al., "Synthesis of Nano-Scale Fast Ion Conducting Cubic Li7La3Zr2O12," Nanotechnology, 2013, 24, 42005:1-8.

Sharafi et al., "Impact of Air Exposure and Surface Chemistry on Li—Li7La3Zr2O12 Interfacial Resistance," J. Mater. Chem. A, 2017, 5:13475-13487.

Shimonishi et al., "Synthesis of Garnet-Type Li7 XLa3Zr2O12-1/2x and Its Stability in Aqueous Solutions," Solid State Ionics, 2011, 183:48-53.

Smolenski et al., "A Potentiometric Study of the Interaction of Zr(IV) and O(II) Ions in the LiCl—KCl Eutectic Molten Salt," J. Electrochem. Soc., 2004, 151(9):E302, https://doi.org/10.1149/1.1779332.

Thangadurai et al., "Garnet-Type Solid-State Fast Li Ion Conductors for Li Batteries: Critical Review," Chem. Soc. Rev. 2014, 43:4714-4727, https://doi.org/10.1039/c4cs00020j.

Thompson et al., "Tetragonal vs. Cubic Phase Stability in Al-Free Ta Doped Li7La3Zr2O12 (LLZO)," J. Mater. Chem. A 2014, 2:13431-13436.

Toda et al., "Low Temperature Cubic Garnet-Type CO2-Doped Li7La3Zr2O12," Solid State Ionics, 2013, 233:102-106.

Tsai et al., "High Conductivity of Mixed Phase Al-Substituted Li7La3Zr2O12," J. Electroceram., 2015, 35:25-32.

Van Hemmen et al., "Plasma and Thermal ALD of Al2O3 in a Commercial 200 Mm ALD Reactor," J. Electrochem. Soc., 2007, 154(7):165-169, https://doi.org/10.1149/1.2737629.

Wang et al., "Phase Transition in Lithium Garnet Oxide Ionic Conductors Li7La3Zr2O12: The Role of Ta Substitution and H2O/CO2 Exposure," J. Power Sources, 2015, 275:612-620.

Wang et al., "Preparation of Lanthanum Zirconate Nano-Powders by Molten Salts Method," J. Non-Cryst. Solids, 2010, 356:1049-1051.

Wang et al., "Atomic Layer Deposited Lithium Silicates as Solid-State Electrolytes for All-Solid-State Batteries," ACS Appl. Mater. Interfaces, 2017, 9(37):31786-31793, https://doi.org/10.1021/acsami.7b07113.

Wang et al., "Atomic Layer Deposition of Lithium Niobium Oxides as Potential Solid-State Electrolytes for Lithium-Ion Batteries," ACS Appl. Mater. Interfaces, 2018, 10(2):1654-1661, https://doi.org/10.1021/acsami.7b13467.

Weller et al., "Synthesis of Fine Cubic Li7La3Zr2O12 Powders in Molten LiCl—KCl Eutectic and Facile Densification by Reversal of Li+/H+ Exchange," ACS Appl. Energy Mater., Jan. 9, 2018, 1:552-560.

Weller et al., U.S. Appl. No. 16/399,331, filed Apr. 30, 2019, 47 pages.

Whetten et al., "Li7La3Zr2O12 Nanoparticles Prepared Using Molten Salt Synthesis as Ceramic Fillers in Polymer Composite Solid Electrolytes," Presented at MRS Spring Meeting & Exhibit, 2018, Phoenix, AZ, 3 pages.

(56) References Cited

OTHER PUBLICATIONS

Wolfenstine et al., "Synthesis and High Li-Ion Conductivity of Ga-Stabilized Cubic Li7La3Zr2O12," Mater. Chem. Phys. 2012, 134:571-575.
Xie et al., "Low-Temperature Synthesis of Li7La3Zr2O12 with Cubic Garnet-Type Structure," Mater. Res. Bull., 2012, 47:1229-1232.
Yang et al., "Composite Polymer Electrolytes with Li7La3Zr2O12 Garnet-Type Nanowires as Ceramic Fillers: Mechanism of Conductivity Enhancement and Role of Doping and Morphology," ACS Appl. Mater. Interfaces 2017, 9:21773-21780, and the Supporting Information, S1-S15.
Yang et al., "Nanostructured Garnet-Type Solid Electrolytes for Lithium Batteries: Electrospinning Synthesis of Li7La3Zr2O12 Nanowires and Particle Size-Dependent Phase Transformation," J. Phys. Chem. C, 2015, 119(27):14947-14953.
Yi et al., "Flame Made Nanoparticles Permit Processing of Dense, Flexible, Li+ Conducting Ceramic Electrolyte Thin Films of Cubic—Li7La3Zr2O12 (c-LLZO)," J. Mater. Chem. A, 2016, 4:12947-12954.
Yi et al., "Key Parameters Governing the Densification of Cubic—Li7La3Zr2O12 Li+ Conductors," J. Power Sources 2017, 352:156-164.
Zhang, "Low Temperature Synthesis of Complex Refractory Oxide Powders From Molten Salts," J. Pakistan Mater. Soc., 2007, 1:49-53.
Zhong et al., "Layered lithium-rich oxide nanoparticles: low-temperature synthesis in mixed molten salt and excellent performance as cathode of lithium-ion battery," Ionics (Kiel), 2017, 23:1955-1966.
Afyon et al. "A Shortcut to Garnet-Type Fast Li-Ion Conductors for All-Solid State Batteries". J. Mater. Chem. A 2015, 3, pp. 18636-18648.
Awaka et al. "Synthesis and Structure Analysis of Tetragonal Li7La3Zr2O12 with the Garnet-Related Type Structure". J. Solid State Chem. 2009, 182:2046-2052, https://doi.org/10.1016/j.jssc.2009.05.020.
Baek et al. "Garnet Related Lithium Ion Conductor Processed by Spark Plasma Sintering for All Solid State Batteries". J. Power Sources 2014, 249:197-206.
Buschmann et al. "Lithium Metal Electrode Kinetics and Ionic Conductivity of the Solid Lithium Ion Conductors Li7La3Zr2O12' and Li7—xLa3Zr2—xTaXO12 with Garnet-Type Structure". J. Power Sources 2012, 206:236-244.
Cassir et al., "Synthesis of ZrO2 Thin Films by Atomic Layer Deposition: Growth Kinetics, Structural and Electrical Properties," Applied Surface Science, 2002, 193(1-4):120-128.
Chan et al. "Nanostructured Garnet-Type Li7La3Zr2O12 : Synthesis, Properties, and Opportunities as Electrolytes for Li-Ion Batteries," Electrochim. Acta 2017, 253, 268-280.
Chen et al., "Effect of a ZrO2 Coating on the Structure and Electrochemistry of LixCoO2 When Cycled to 4.5 V," Electrochem. Solid-State Lett., 2002, 5(10):A213, https://doi.org/10.1149/1.1503202.
Chen et al., "Towards Shape Control of Metal Oxide Nanocrystals in Confined Molten Media," Chem. Nano. Mat., 2015, 1(1):18-26, https://doi.org/10.1002/cnma.201500032.
Cheng et al. "Effect of surface microstructure on electrochemical performance of garnet solid electrolytes," ACS Appl. Water. Interfaces, 2015, 7:2073-2081.
Cheng et al. "Interrelationships among Grain Size, Surface Composition, Air Stability, and Interfacial Resistance of Al-Substituted Li7La3Zr2O12 Solid Electrolytes". ACS Appl. Mater. Interfaces 2015, 7:17649-17655.
Cho et al., "Zero-Strain Intercalation Cathode for Rechargeable Li-Ion Cell," Angew. Chemie—Int. Ed. 2001, 40(18):3367-3369, https://doi.org/10.1002/1521-3773.
Danks et al. "The evolution of 'sol-gel' chemistry as a technique for materials synthesis" Mater. Horizons,2016 3:91-112.

Daviannapoorani et al., "Synthesis of Lithium garnets from La2Zr2O7 pyrochlore," Solid State Ionics, Oct. 24, 2015, 283:123-130.
Deviannapoorani et al. "Synthesis of Garnet Structured Li7+xLa3YXZr2 XO12 (X=0-0.4) by Modified Sol-Gel Method," J. Sol-Gel Sci. Technol. 2012, 64:510-514.
Deviannapoorani et al. "Synthesis of Lithium Garnets from La2Zr2O7Pyrochlore," Solid State Ionics 2015, 283:123-130.
Fang et al. "Grain growth during sintering of nanosized particles," Ceram. Trans., 2010, 209:389-400.
Fu et al. "Flexible, solid-state, ion-conducting membrane with 3D garnet nanofiber networks for lithium batteries," PNAS, Jun. 28, 2016, 113(26):7094-7099.
Geiger et al. "Crystal Chemistry and Stability of "Li7La3Zr2O12" garnet: A Fast Lithium-Ion Conductor," Inorg. Chem. 2011, 50:1089-1097.
Gordon et al. "101, Preparation of Nano- and Microstructured Garnet Li7La3Zr2O12 Solid Electrolytes for Li-Ion Batteries via Cellulose Templating," ACS Sustainable Chem. Eng., 2016, 4:6391-6398.
Guo et al. "Molten Salt Synthesis of Different Ionic Radii Metallic Compounds Doped Lithium Titanate Used in Li-Ion Battery Anodes," Mater. Trans., 2017, 58:383-389.
Guo et al. "Molten Salt Synthesis of Nano-Sized Li4Ti5O12 Doped with Fe2O3 for Use as Anode Material in the Lithium-Ion Battery". RSC Adv., 2014, 4:60327-60333.
Hamalainen et al., "Lithium Phosphate Thin Films Grown by Atomic Layer Deposition," J. Electrochem. Soc., 2012, 159(3):A259-A263, https://doi.org/10.1149/2.052203jes.
Hanc et al. "On Fabrication Procedures of Li-Ion Conducting Garnets," J. Solid State Chem., Nov. 2016, 248:51-60.
Huang et al. "Effect of Sintering Temperature on Structure and Ionic Conductivity of Li7—xLa3Zr2O12-0.5x (x=0.5 ~ 0.7) Ceramics," Solid State Ionics, 2011, 204:41-45.
Huang et al. "Growth of Well-Developed LaOCl Microplates by Chloride Salt-Assisted Method," CrystEngComm 2017, 19:2971-2976.
Huang et al. "Preparation of CaZrO3 Powders by a Microwave—Assisted Molten Salt Method," J. Ceram. Soc. Jpn. 2016, 124:593-596.
Ishiguro et al. "Ta-Doped Li7La3Zr2O12 for Water-Stable Lithium Electrode of Lithium-Air Batteries," J. Electrochem. Soc., 2014, 161:A668-A674.
Janani et al. "Synthesis of cubic Li7La3Zr2O12 by modified sol-gel process," Ionics (Kiel), 2011, 17:575-580.
Jin et al. "Al-doped Li7La3Zr2O12 synthesized by a polymerized complex method," Journal of Power Sources, 2011, 196:8683-8687.
Karakaya et al., "Assembly of Molten Transition Metal Salt-Surfactant in a Confined Space for the Synthesis of Mesoporous Metal Oxide-Rich Metal Oxide-Silica Thin Films," Chem. Mater., 2011, 23(12):3062-3071, https://doi.org/10.1021/cm200932k.
Kazyak et al., "Atomic Layer Deposition of the Solid Electrolyte Garnet Li7La3Zr2O12," Chem. Mater., 2017, 29(8):3785-3792, https://doi.org/10.1021/acs.chemmater.7b00944.
Keiteb et al., "A Modified Thermal Treatment Method for the Up-Scalable Synthesis of Size-Controlled Nanocrystalline Titania," Appl. Sci., 2016, 6(295):1-10.
Kim et al. "Electrochemical Stability of Li6.5La3Zr1.5M0.5O12 (M=Nb or Ta) against Metallic Lithium. Front," Energy Res., 2016, 4,1-7.
Kim et al., "Atomic Layer Deposition of ZrO2 Thin Films with High Dielectric Constant on TiN Substrates," Electrochem. Solid-State Lett., 2008, 11(3):G9, https://doi.org/10.1149/1.2825763.
Knauth, "Inorganic Solid Li Ion Conductors: An Overview," Solid State Ionics 2009, 180:911-916.
Kokal, "Solid State Electrolytes for All-Solid-State 3D Lithium-ion Batteries," Technische Universiteit Eindhoven, Jan. 1, 2012, 42-46.
Kokal et al. "Sol-gel Synthesis and Lithium Ion Conductivity of Li7La3Zr2O12 with Garnet-Related Type Structure". Solid State Ionics 2011, 185,42-46.
Kozen et al., "Atomic Layer Deposition of the Solid Electrolyte LiPON," Chem. Mater., 2015, 27(15):5324-5331, https://doi.org/10.1021/acs.chemmater.5b01654.

(56) References Cited

OTHER PUBLICATIONS

Larraz et al. "Cubic Phases of Garnet-Type Li7La3Zr2O12: The Role of Hydration". J. Mater. Chem. A, 2013, 1:11419i.

Li et al., "Significant Impact on Cathode Performance of Lithium-Ion Batteries by Precisely Controlled Metal Oxide Nanocoatings via Atomic Layer Deposition," J. Power Sources, 2014, 247:57-69, https://doi.org/10.1016/j.ipowsour.2013.08.042.

Liu et al. "Garnet-type Li6.4La3Zr1.4Ta0.6O12 thin sheet: Fabrication and application in lithium-hydrogen peroxide semi-fuel cell" Electrochemistry Comminications, 2014, 48:147-150.

Liu et al. "High Lithium Ionic Conductivity in the Garnet-Type Oxide Li72—XLa3Zr2—XMoXO12 (X=0-0.3) Ceramics by Sol-Gel Method," J. Am Ceram. Soc., 2017, 100:1527-1533.

Liu et al. "Salt Melt Synthesis of Ceramics, Semiconductors and Carbon Nanostructures," Chem. Soc. Rev., 2013, 42(21):8237. https://doi.org/10.1039/C3CS60159E.

Liu et al., "Atomic Layer Deposition of Lithium Tantalate Solid-State Electrolytes," J. Phys. Chem. C, 2013, 117(39):20260-20267, https://doi.org/10.1021/jp4063302.

Liu et al., "Toward 3D Solid-State Batteries via Atomic Layer Deposition Approach," Front. Energy Res., Mar. 2018, 6:1-5. https://doi.org/10.3389/fenrg.2018.00010.

Liu et al., "Ultrathin Atomic Layer Deposited ZrO2 coating to Enhance the Electrochemical Performance of Li4Ti5O12 as an Anode Material," Electrochim. Acta., 2013, 93:195-201, https://doi.org/10.1016/j.electacta.2012.12.141.

Loho et al., "Garnet-Type Li7La3Zr2O12 Solid Electrolyte Thin Films Grown by CO2-Laser Assisted CVD for All-Solid-State Batteries," J. Electrochem. Soc., 2017, 164(1):A6131-A6139 https://doi.org/10.1149/2.0201701jes.

Long et al., "Three-Dimensional Battery Architectures," Chem. Rev., 2004, 104:4463-4492, https://doi.org/10.1021/cr0207401.

Matsuda et al. "Phase Formation of a Garnet-Type Lithium-Ion Conductor Li7—3xAlxLa3Zr2O12," Solid State Ionics 2015, 277, 23-29.

Miyashiro et al., "Improvement of Degradation at Elevated Temperature and at High State-of-Charge Storage by ZrO2 Coating on LiCoO2," J. Electrochem. Soc., 2006, 153(2):A348, https://doi.org/10.1149/1.2149306.

\* cited by examiner

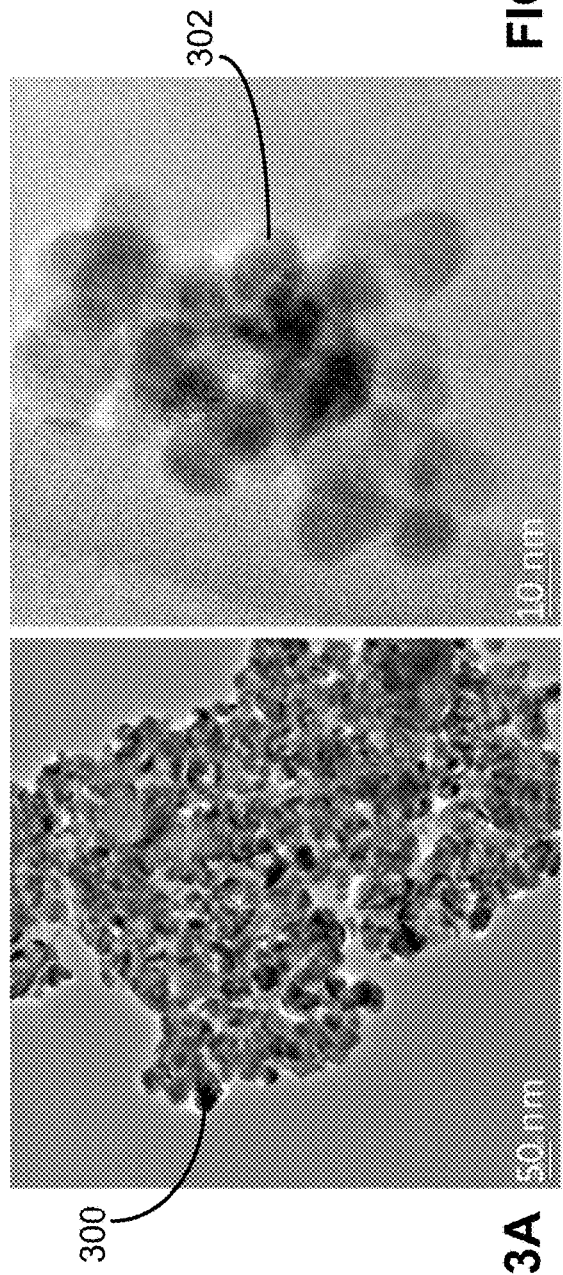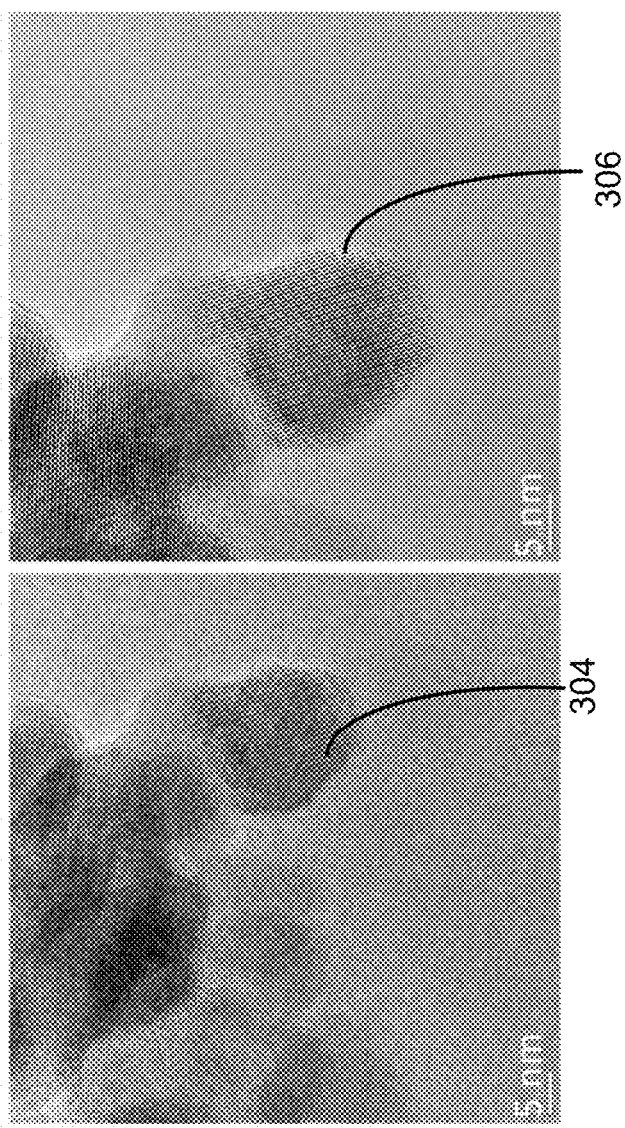
FIG. 3A   FIG. 3B   FIG. 3C   FIG. 3D

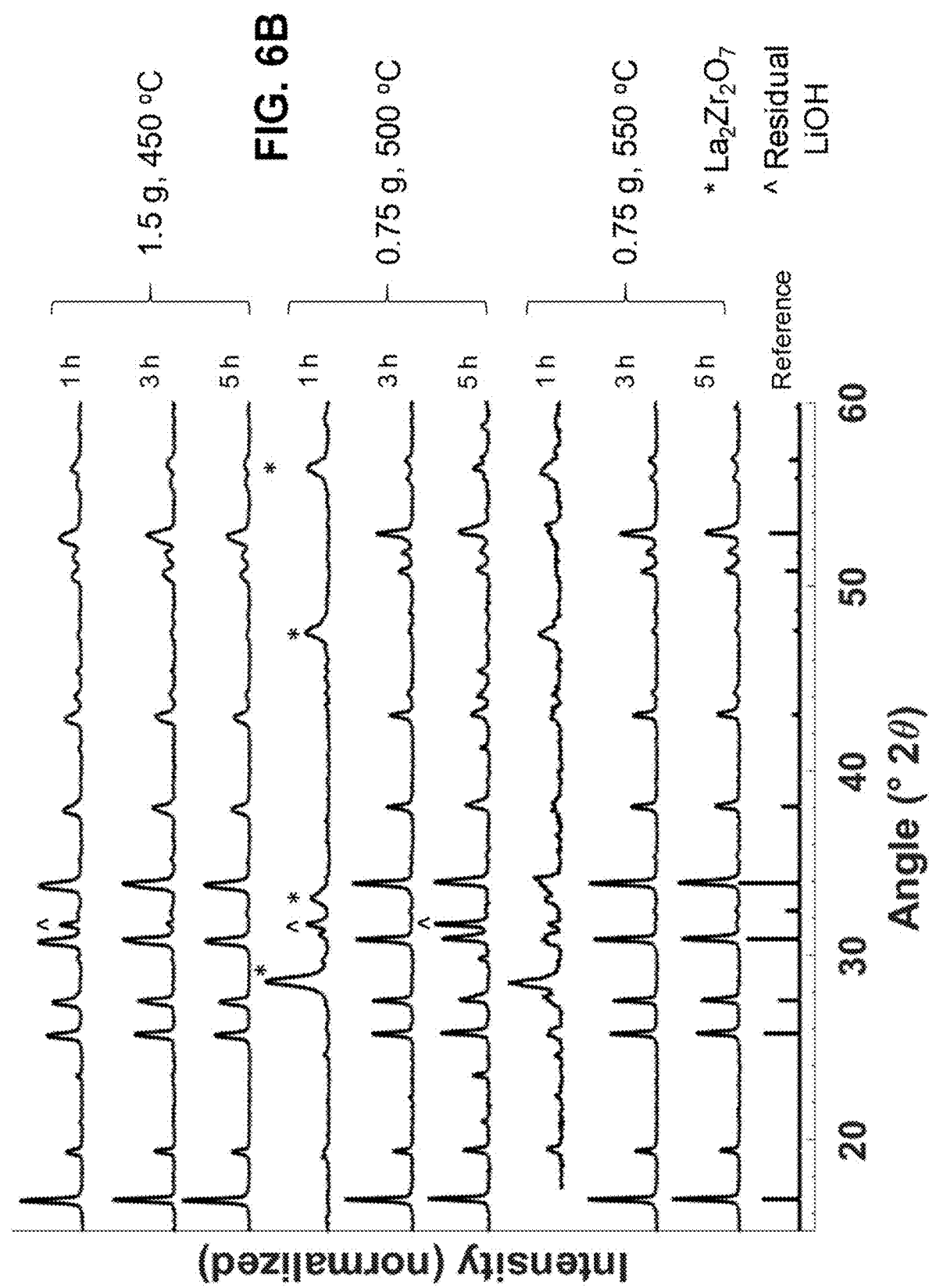

SYNTHESIS OF LITHIUM LANTHANUM ZIRCONATE FROM NANOCRYSTALLINE LANTHANUM ZIRCONATE

CROSS-REFERENCE TO RELATED APPLICATIONS

This application is a divisional of U.S. application Ser. No. 16/399,331 filed on Apr. 30, 2019, which application claims the benefit of U.S. Application No. 62/667,383 filed on May 4, 2018, which is incorporated by reference herein in its entirety.

STATEMENT OF GOVERNMENT INTEREST

This invention was made with government support under the award DMR-1553519 from the National Science Foundation. The government has certain rights in this invention.

TECHNICAL FIELD

This invention relates the synthesis of lithium lanthanum zirconate (LLZO) from lanthanum zirconate (LZO) nanocrystals. The LLZO can be in the form of a layer (e.g., a thin film) or other structure.

SUMMARY

Lithium lanthanum zirconate ($Li_7La_3Zr_2O_{12}$, LLZO) is a fast ion conductor for Li-ions suitable for use as a solid electrolyte that can enhance the energy density and safety of Li-ion batteries. Advantages related to reduction in the size of this material to nanometric dimensions include the ability to stabilize the highly conducting cubic phase without the need for extrinsic dopants, enhanced densification and sintering properties, and lower temperature and lower cost preparation methods. Further, beginning with ultrafine crystals may enable fine-tuning of the final grain size of a dense LLZO film, which may in turn enable Hall-Petch strengthening of the final dense ceramic. As described herein, LLZO thin films are fabricated from salts of lithium and lanthanum (and optionally a dopant such as aluminum, gallium, calcium, tantalum, niobium, or molybdenum, or a combination thereof) mixed with lanthanum zirconate nanocrystals. Stoichiometric Li- and La-precursors are mixed with these nanocrystals to yield a slurry suitable for tape casting resulting in thin films, which after calcination and sintering, results in LLZO thin films having fine grain structure and superior mechanical properties (e.g., flexible, non-brittle) suitable for facile incorporation into battery fabrication schemes. In some implementations, lanthanum zirconate nanocrystals containing excess lanthanum and optionally a dopant such as aluminum, gallium, calcium, tantalum, niobium, molybdenum, or a combination thereof is mixed with salts of lithium and then calcined and sintered to form LLZO.

In a first general aspect, fabricating a layer including lithium lanthanum zirconate ($Li_7La_3Zr_2O_{12}$) includes forming a slurry including lanthanum zirconate ($La_2Zr_2O_7$) nanocrystals, a lithium-containing compound, and a lanthanum-containing compound to yield a dispersion including lithium, lanthanum, and zirconium. The slurry is dispensed onto a substrate and dried, and the dried slurry is calcined to yield the layer including lithium lanthanum zirconate.

Implementations of the first general aspect may include one or more of the following features.

The lithium-containing compound can include lithium nitrate. The lanthanum-containing compound can include lanthanum nitrate.

In some cases, the slurry includes a dopant, such as one or more of aluminum, gallium, tantalum, niobium, and molybdenum. In some cases, the slurry includes a dispersant, such as one or more of a surfactant, fish oil, poly (acrylic acid) and salts thereof, poly(methacrylic acid) and salts thereof, and phosphate esters. In some cases, the slurry includes a plasticizer, such as one or more of polyethylene glycol, benzyl butyl phthalate, and glycerol. In some cases, the slurry includes a binder, such as polyvinylbutyral.

Disposing the slurry on the substrate can include casting the slurry on the substrate (e.g., tape-casting or spin-casting) or dip-coating the substrate in the slurry. Calcining the dried slurry can include heating the dried slurry at a temperature between 700° C. and 1200° C. for a few minutes to several hours. In some cases, forming the slurry includes forming the slurry in one or more of methanol and ethanol.

The lanthanum zirconate nanocrystals typically have an average diameter in a range of 5 nm to 50 nm, or in a range of 10 nm to 30 nm. The layer including lithium lanthanum zirconate typically has a grain size of less than 300 nm. A thickness of the layer is typically in a range of 1 μm to 500 μm, or 5 μm to 500 μm.

The lithium lanthanum zirconate can be cubic phase lithium lanthanum zirconate. The dispersion can include lithium, lanthanum, and zirconium in a molar ratio of 7:3:2, or in a molar ratio of more than 7 moles lithium to 3 moles lanthanum to 2 moles zirconium (e.g., an excess of lithium).

In a second general aspect, synthesizing lithium lanthanum zirconate ($Li_7La_3Zr_2O_{12}$) includes combining lanthanum zirconate ($La_2Zr_2O_7$) nanocrystals having excess lanthanum with one or more salts of lithium to yield a mixture; calcining the mixture to yield a calcined mixture; and sintering the calcined mixture to yield lithium lanthanum zirconate.

Implementations of the second general aspect may include one or more of the following features.

The lanthanum zirconate nanocrystals can include a dopant. The one or more salts of lithium can be molten. The mixture can be in the form of a slurry.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF THE DRAWINGS

FIGS. 3A-3D show representative transmission electron microscopy (TEM) images of the LZO used as a precursor.

FIGS. 6A and 6B show representative XRD patterns of products obtained after using nanocrystals with a nominal composition of $La_{2.4}Zr_{1.12}Ta_{0.48}O_{7+x}$ (LZTO), where x=0.04, as precursors to prepare Ta-doped LLZO (LLZTO) with a nominal composition of $Li_{6.4}La_3Ta_{0.6}Zr_{1.4}O_{12}$ in a molten salt (NaOH:KOH eutectic) containing different amounts of $Li_2O_2$ at different reaction temperatures and reaction times.

DETAILED DESCRIPTION

Lithium lanthanum zirconate ($Li_7La_3Zr_2O_{12}$, LLZO) can be synthesized using a variety of methods, such as solid-state reaction, sol-gel, chemical or atomic layer deposition, and molten salt synthesis. In most of these synthesis methods, $La_2Zr_2O_7$ (LZO) is formed as an intermediate phase at lower temperatures, shorter reaction times, or both than required to obtain LLZO. Further reaction of the LZO with Li- and La-precursors lead to the formation of LLZO. Hence, one route towards obtaining nanostructured LLZO is to begin with nanostructured LZO as a starting phase.

Molten salt synthesis (MSS) (sometimes known as "salt melt synthesis" or the "molten salt method") can be used to obtain various-sized particles of ceramics from generally inexpensive precursors at temperatures or times lower than those required in solid state reactions. In MSS, precursors including or consisting of metal oxides or metal salts are mixed intimately with a salt (or salt mixture, often a eutectic), followed by heat treatment above the melting point of the salt(s) to provide the thermodynamic driving force for dissolution of the precursors and to promote the formation of the desired crystalline phase. Synthesis of LZO in a eutectic mixture of sodium hydroxide and potassium hydroxide (41:59 wt % NaOH:KOH) is also described. In this process, MSS is used to obtain non-agglomerated LZO nanopowders in large quantities suitable as a reagent for formation of LLZO. These more uniform and fine powders may enable roll-to-roll processing of electrolyte materials, e.g., tape-casting, and thus better incorporation into practical battery production methods. This factor can help overcome the challenge of using a brittle, crystalline ceramic as an electrolyte. On a lab scale, tens of grams of uniform LZO can be obtained in a matter of hours using a single small furnace, indicating that this synthesis approach provides a scalable method of LLZO production.

Figure 1:
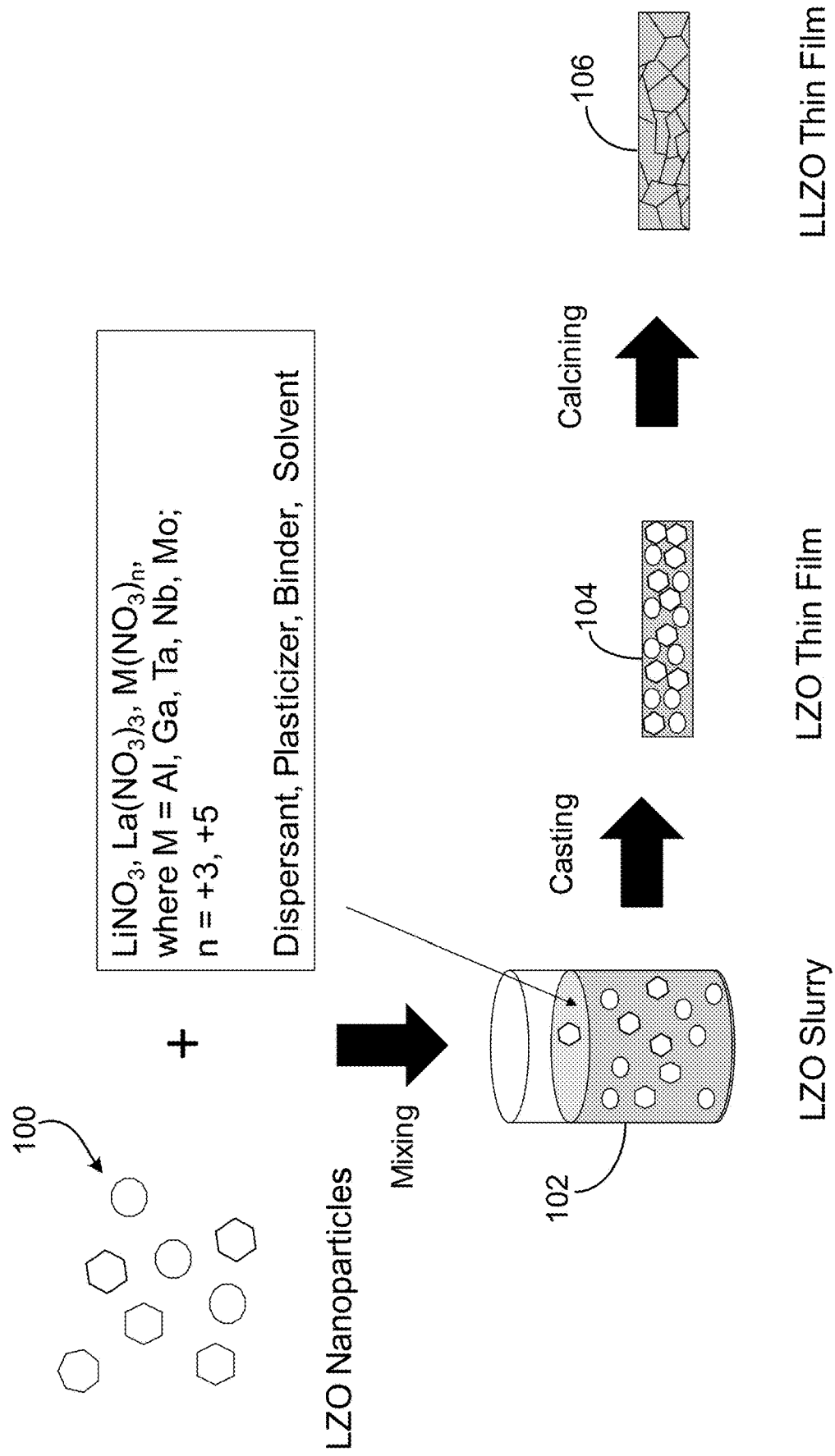
FIG. 1 shows a schematic illustrating the formation of $Li_7La_3Zr_2O_{12}$ (LLZO) thin films from $La_2Zr_2O_7$ (LZO) nanoparticle slurries.

FIG. 1 depicts the formation of LLZO thin films from LZO nanoparticle slurries. LZO nanocrystals 100 with diameters of about 20 nm may be prepared by MSS in a eutectic mixture of NaOH and KOH at elevated temperatures (e.g., 400-550° C.) for 1-4 hours, among other possible methods. LZO nanocrystals 100 can also be synthesized using other methods such as hydrothermal synthesis, sol-gel synthesis, and salt-assisted combustion synthesis. These LZO nanocrystals are dispersed in polar media (e.g., water and low molecular weight alcohols such as methanol or ethanol) or non-aqueous organic solvent systems (such as ethanol and methyl ethyl ketone, or ethanol and toluene), sometimes with the aid of a dispersant, to yield slurry 102 of LZO nanocrystals. In some implementations, slurry 102 includes $LiNO_3$, $La(NO_3)_3$, $M(NO_3)_n$, or a combination thereof, where M includes one or more of Al, Ga, Ta, Nb, and Mo, and n=+3 or +5. In some implementations, slurry 102 includes one or more of a dispersant, a plasticizer, and a binder in the solvent.

The LZO nanocrystals can then act as substrates upon which to form LLZO if suitable Li-, La-, and other (e.g., dopant) precursors are added in appropriate (e.g., stoichiometric) quantities to the slurry. Slurry 102 can be cast into LZO layer 104 and dried, followed by calcination to complete the conversion of LZO to LLZO layer 106. In some cases, layers 104 and 106 are thin films. Layers 106 of LLZO can be formed by methods including tape-casting, spin-casting, and dip-coating to convert the nanocrystalline LZO into fine-grained LLZO films by solid phase reaction and subsequent sintering.

In some implementations, LZO nanocrystals that contain excess amount of lanthanum and optionally dopants are prepared such that only suitable amounts of Li precursor is required in order to transform the LZO into LLZO. By including all of the required elements, except for Li, within the nanocrystal, the transformation to LLZO can be achieved in a facile manner in a molten salt reaction or calcination as discussed previously.

EXAMPLES

Example 1: Synthesis of $La_2Zr_2O_7$(LZO) Nanocrystals and Transformation to Al-Doped LLZO by Tape-Casting All reagents used were of ACS grade or higher and used as-received. Sodium Hydroxide (NaOH), potassium hydroxide (KOH), lithium nitrate ($LiNO_3$), zirconium oxynitrate ($ZrO(NO_3)_2$) hydrate, and aluminum nitrate ($Al(NO_3)_3$) nonahydrate (used to provide $Al^{3+}$ dopants to stabilize the cubic structure of LLZO) were obtained from Sigma-Aldrich. Lanthanum nitrate ($La(NO_3)_3$) hexahydrate was obtained from Alfa Aesar. HPLC grade methanol was obtained from BDH, poly(vinylbutyral) was obtained from Alfa-Aesar, and PEG 400 was obtained from Aldrich. Other reagents similar to those described above may also be used.

To prepare the hydroxide mixture, 41 wt % NaOH and 59 wt % KOH were mixed followed by melting above 400-550° C. (melting point of NaOH—KOH eutectic mixture ~170° C.). The LZO nitrate precursors were prepared by mixing $La(NO_3)_3$, and $ZrO(NO_3)_2$ in a 1:1 molar ratio and grinding thoroughly with a mortar and pestle.

The premixed nitrate precursor salts were then added carefully to the pre-heated molten hydroxide mixture, which produced an evolution of water vapor and other gases (e.g., NOR). Once the precursors were added to the molten hydroxides, the crucible was briefly mixed by agitation and reintroduced to the furnace for a few minutes to a few hours.

Figure 2:
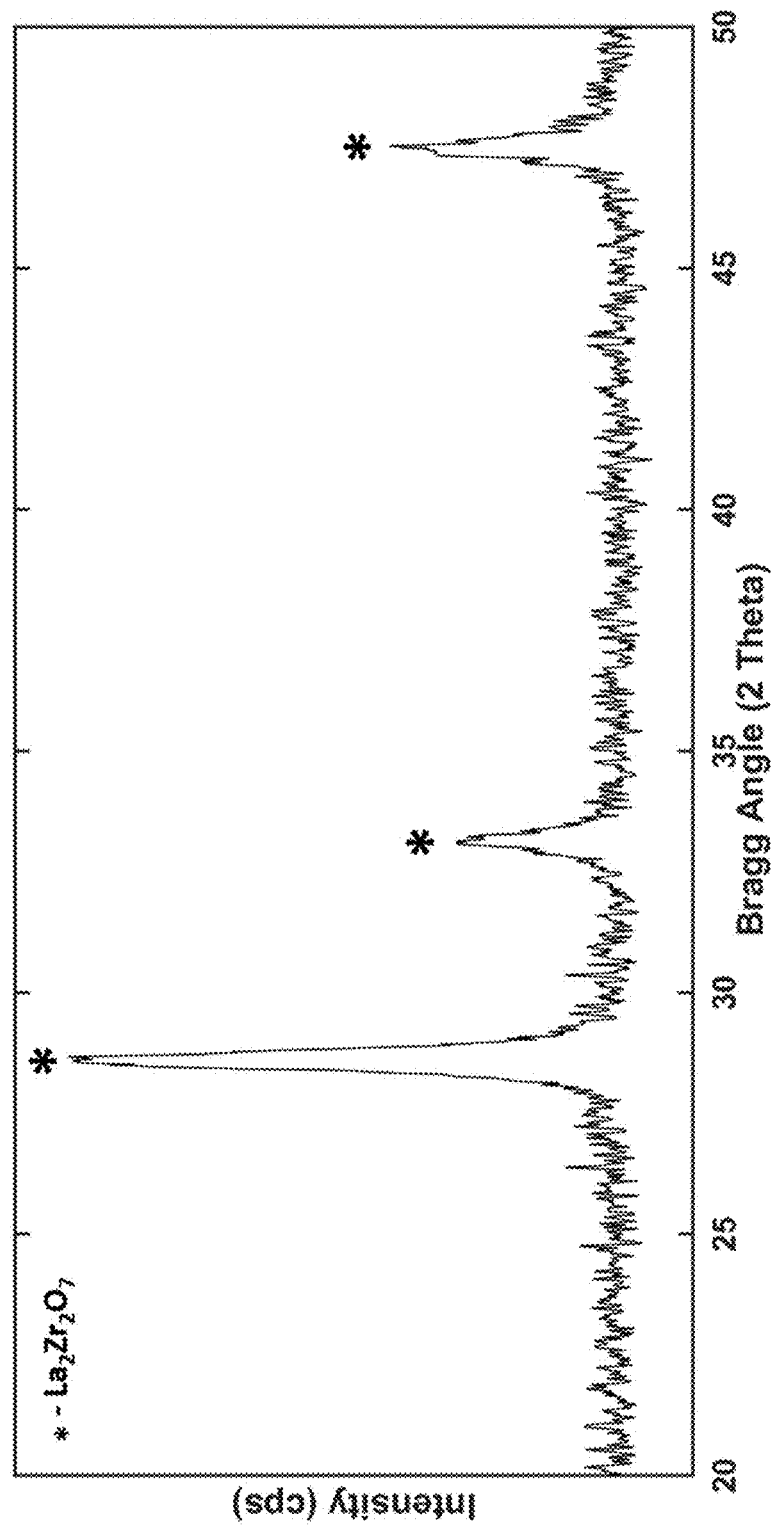
FIG. 2 shows a representative X-ray diffraction (XRD) pattern of LZO formed from molten salt synthesis (used as a precursor to LLZO).

After the synthesis, ultrapure water (>18 MOhm cm) was added to the cooled crucibles, and the suspension was ultrasonicated using an immersion probe (Cole-Parmer 500 W Ultrasonic Processor) to rapidly dissolve the fused hydroxides and generate a slurry of powder. Subsequently, the slurry was vacuum filtered using poly(vinylidene fluoride) membranes (0.22 µm pore size, DuraPore, EMD corporation) and washed with at least 150 mL of water followed by 50 mL of methanol (BDH, HPLC grade) to facilitate fast drying. Conversely, the solution may be washed by repeated centrifugation, decantation of supernatant solution, addition of further ultrapure water and resuspension of powders by ultrasonication. Finally, the filter membranes or centrifuge tubes along with the wet powder cakes were placed in an oven at elevated temperature (e.g., 50° C.) and dried in air. After drying, the powders were removed from the filter membranes or tubes and lightly ground with a mortar and pestle. FIG. 2 shows a representative X-ray diffraction (XRD) pattern of the as-synthesized LZO nanocrystals, and FIGS. 3A-3D show representative transmission electron microscopy (TEM) images of the LZO nanocrystals 300, 302, 304, and 306, respectively.

Formation of a slurry suitable for tape-casting can be performed by mixing nanocrystalline LZO and methanol in a 1:2 ratio (by mass). Subsequently, stoichiometric nitrates of Li, La, and optionally Al (as dopant) may be dissolved in the methanolic slurry following by mixing with e.g. ultrasound or planetary ball milling. A dispersant (e.g., surfactant, fish oil, poly(acrylic acid) and salts thereof, poly(methacrylic acid) and salts thereof, and phosphate esters) may be added at this stage as needed. Subsequently, a binder such as poly(vinylbutyral) may be added comprising a few weight percent of the total slurry. The binder can enable formation of a cohesive film upon drying and removal of the solvent. Optionally, a plasticizer such as poly(ethylene glycol) may be added to increase the flexibility to the resultant film. Once these components are added to the slurry, the slurry is ball-milled using, for example, a planetary ball mill for extended periods of time to result in a stable slurry with a low settling rate. This slurry may be cast using various methods to form thin films which, upon calcination and sintering, result in thin (30-500 µm) LLZO films.

Figure 4:
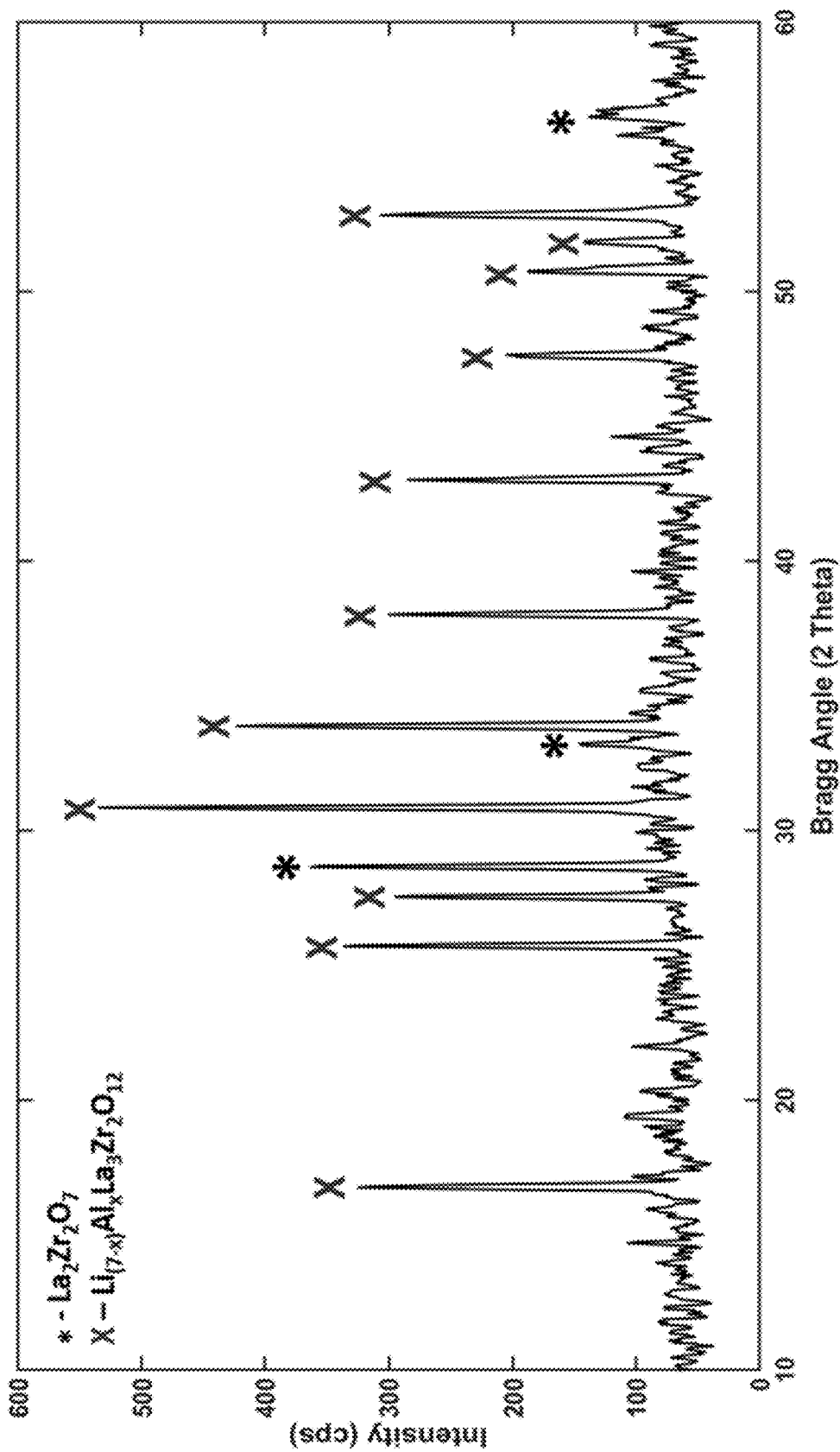
FIG. 4 shows a representative XRD pattern of LLZO formed after calcination of a tape-cast film at 900° C. for 6 hours.

The aforementioned slurry may be tape cast (e.g., using a wire-wound rod coater) in order to form a thin slurry film. Upon drying under the desired conditions (e.g., ambient conditions, elevated temperature, controlled humidity, etc.), a thin, uniform film including nanocrystalline LZO covered in a thin polymer film results. Added Li-, La-, and other precursors are dispersed within this film, adhered to the surface of the LZO crystals, or both. This composite thin film may then be calcined and sintered to yield a film of LLZO. Calcining may include heating at 900° C. for several hours. A representative XRD pattern of a calcined tape showing mostly LLZO ($0.3 \geq x \geq 0$ or $0.25 \geq x \geq 0.2$) with a small amount of LZO is shown in FIG. 4.

Example 2: Synthesis of Off-Stoichiometric, Doped LZO Nanocrystals and Transformation to Ta-Doped LLZO All reagents used were of ACS grade or higher and used as-received. Sodium hydroxide (NaOH), potassium hydroxide (KOH), lithium nitrate ($LiNO_3$), zirconium oxynitrate ($ZrO(NO_3)_2$) hydrate, tantalum (V) pentoxide (used to provide $Ta^{5+}$ dopants to stabilize the cubic structure of LLZO), sodium fluoride and calcium nitrate tetrahydrate (used to provide $Ca^{2+}$ co-dopants) were obtained from Sigma-Aldrich. Lanthanum nitrate ($La(NO_3)_3$) hexahydrate was obtained from Alfa-Aesar. Lithium peroxide ($Li_2O_2$) was obtained from Acros Organics.

The NaOH:KOH eutectic mixture and nitrate salts were prepared in a similar manner as described in Example 1. Typical reaction temperatures were between 400-550° C. with reaction times of 1-4 h. After the synthesis, the products were washed with ultrapure deionized water as described in Example 1.

Figure 5B:
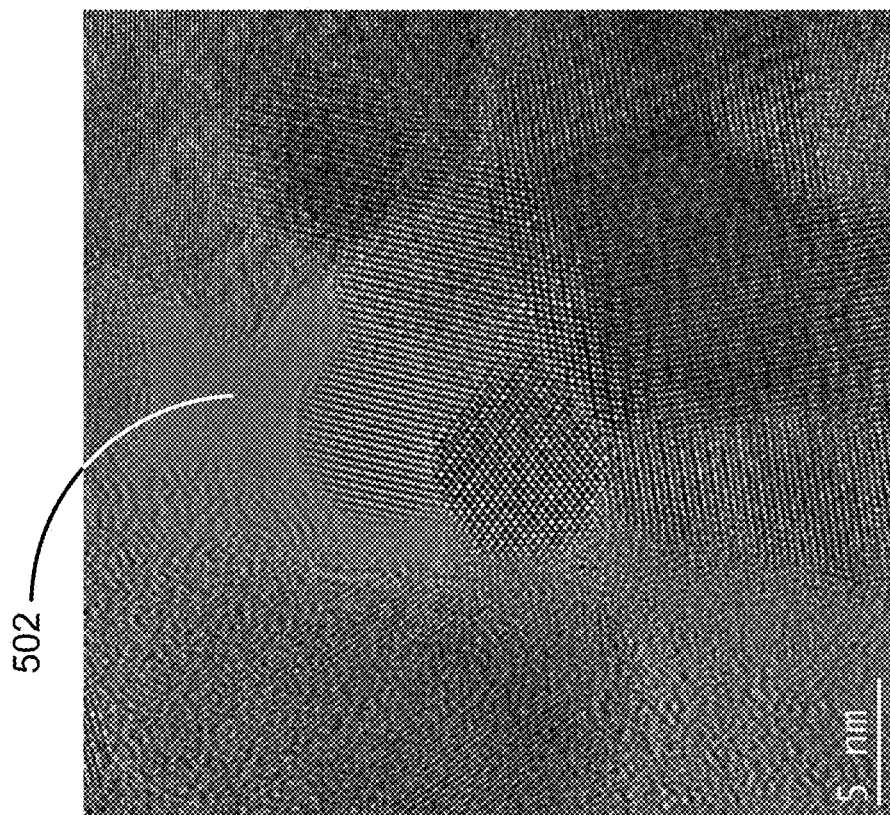
FIGS. 5A and 5B show representative TEM images of off-stoichiometric nanocrystals with a nominal composition of $La_{2.4}Zr_{1.12}Ta_{0.48}O_7$ (corresponding to a La:Zr:Ta ratio of 3:1.4:0.6) used as a precursor to make LLZO.
Figure 5A:
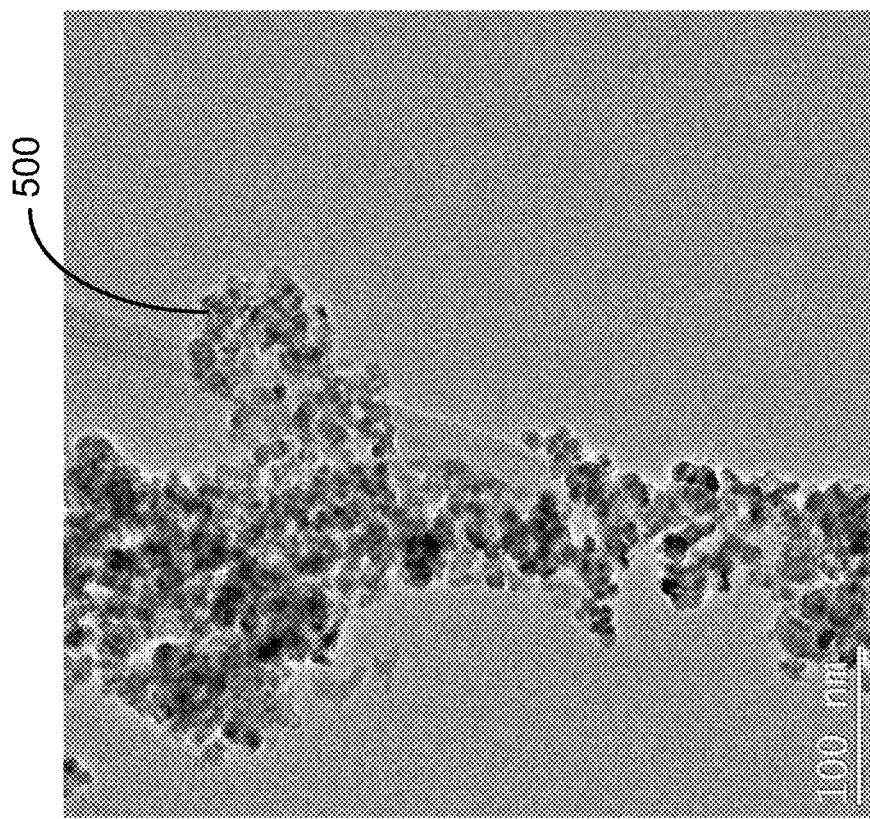
Figure 5C:
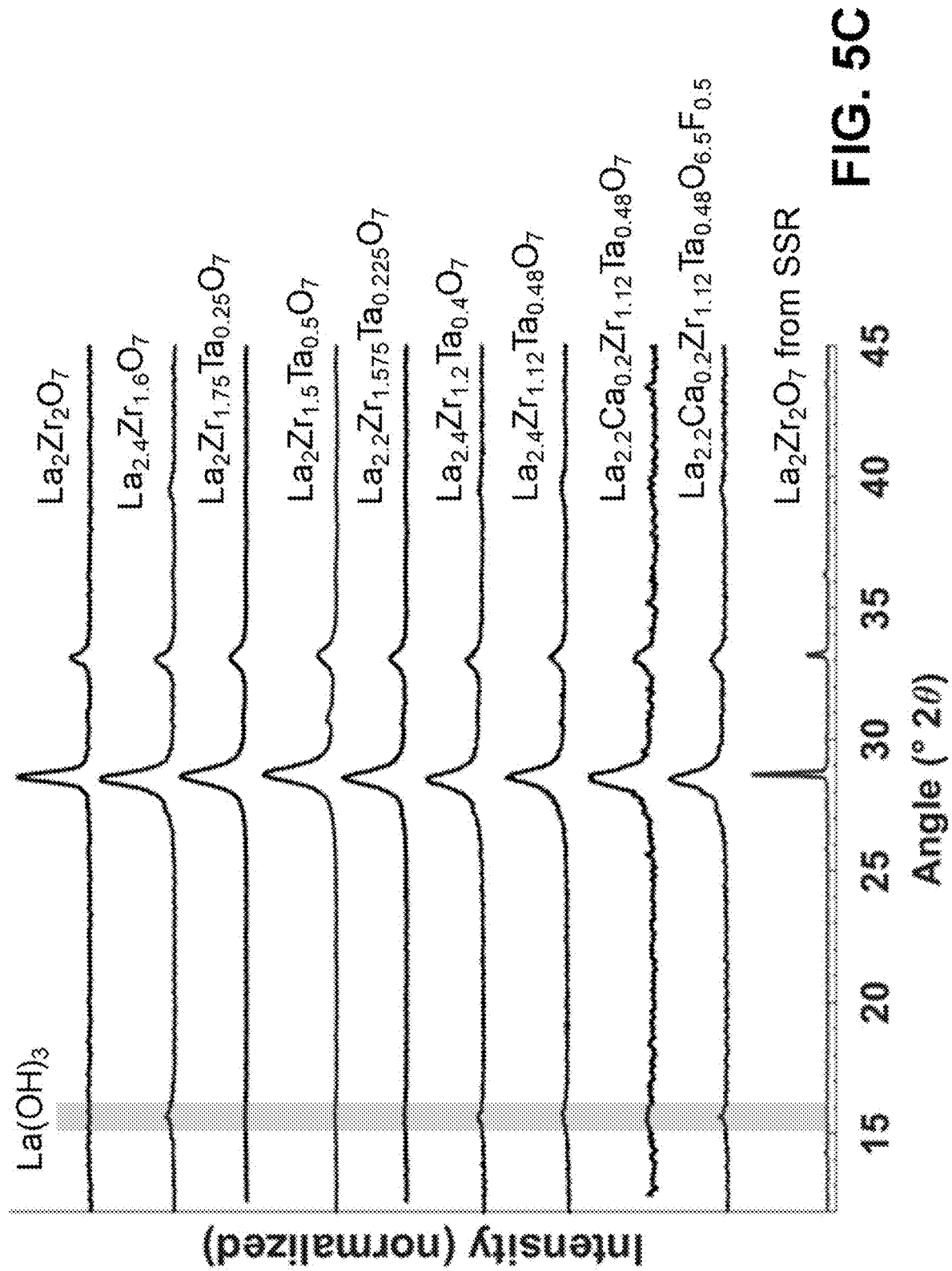
FIG. 5C shows XRD patterns of various off-stoichiometric, doped, and co-doped LZO nanocrystals synthesized using molten salt reaction compared to stoichiometric nanocrystals and powder synthesized using solid state reaction (SSR).

Representative low and high magnification TEM images of the synthesized off-stoichiometric LZO nanocrystals 500, 502 (nominal composition $La_{2.4}Zr_{1.12}Ta_{0.48}O_7$) are shown in FIGS. 5A and 5B, respectively, showing the nanometric particle sizes. XRD patterns of the LZO nanocrystals with various nominal compositions are shown in FIG. 5C, along with XRD patterns for $La_2Zr_2O_7$ bulk powder synthesized using solid state reaction (SSR) and stoichiometric $La_2Zr_2O_7$ nanocrystals synthesized as described in Example 1 for comparison. The peak broadening in the XRD patterns of the nanocrystal samples compared to the SSR sample arises due to the nanometric particle sizes. The XRD results show that it is feasible to synthesize LZO nanocrystals with excess lanthanum, tantalum doping, calcium and tantalum co-doping, and calcium, tantalum and fluorine co-doping while maintaining the same pyrochlore structure using molten salt synthesis. Only small amounts of $La(OH)_3$ and other unidentified impurity phases were observed in the XRD pattern, suggesting that the dopants were successfully incorporated into the LZO nanocrystals.

Figure 6A:
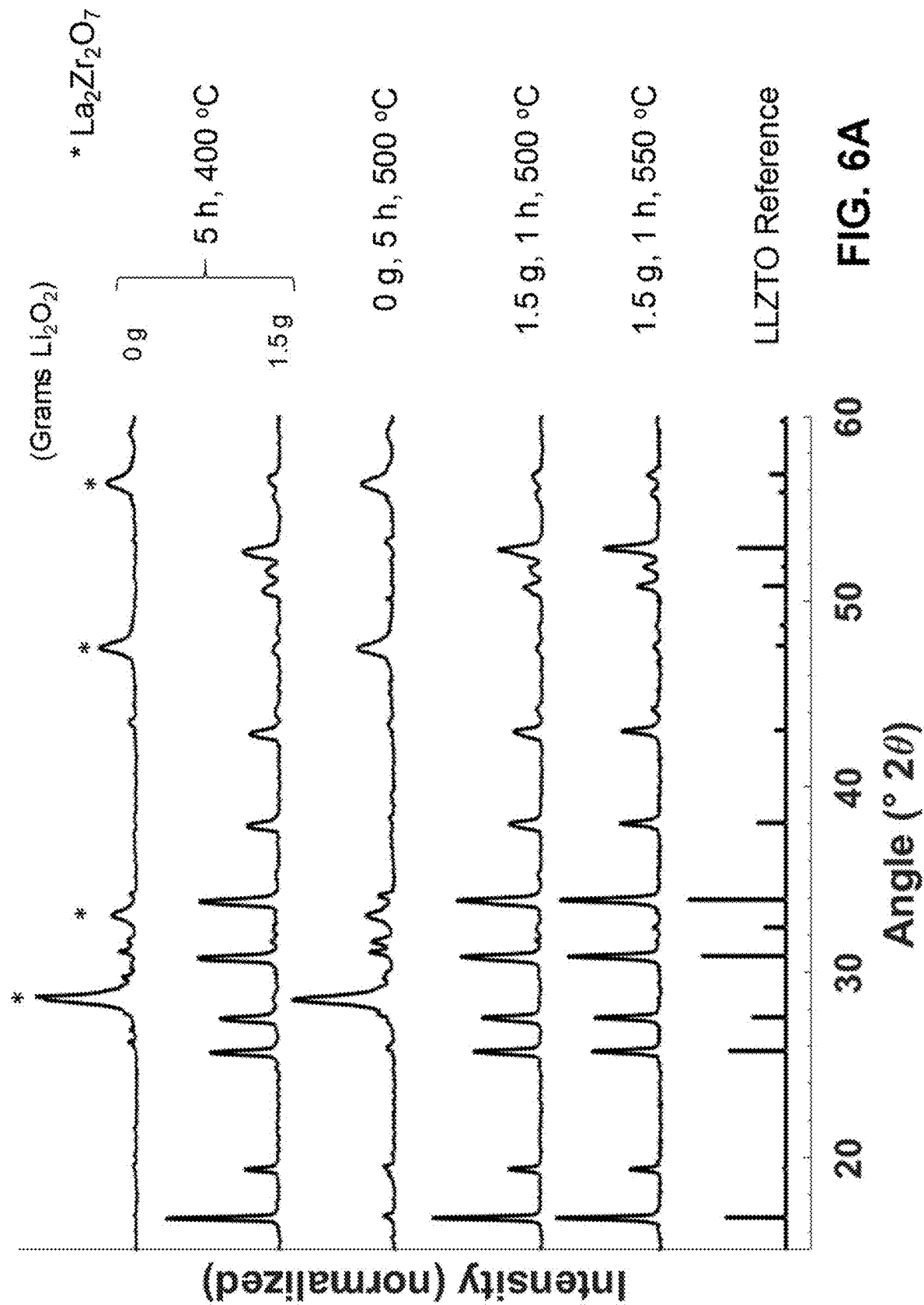
Figure 6D:
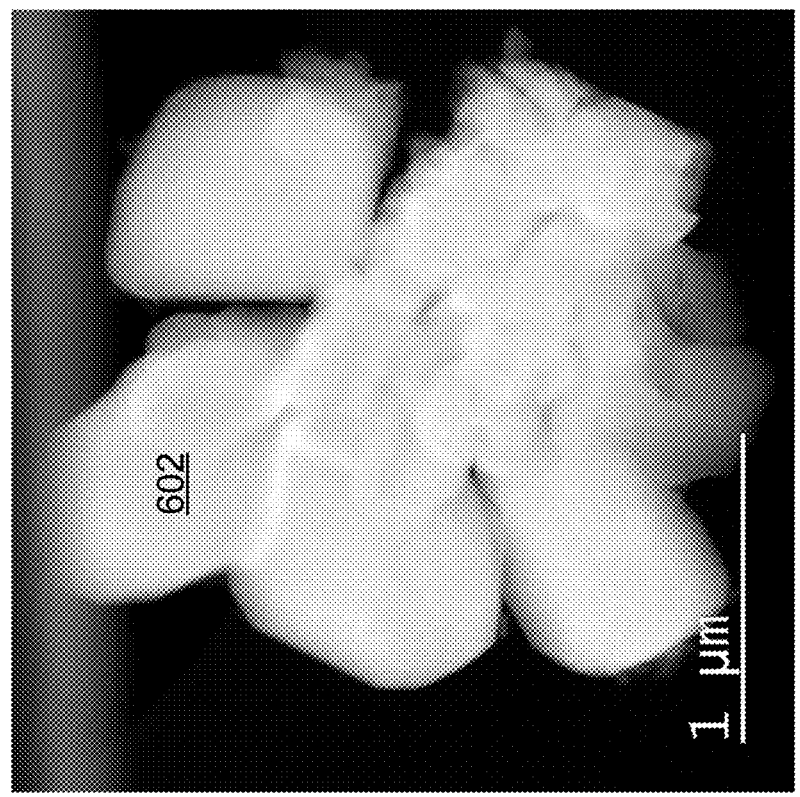
FIGS. 6C and 6D are representative scanning electron microscopy (SEM) and high-angle annular darkfield (HAADF) STEM images, respectively, of LLZTO synthesized by molten salt synthesis (MSS) using off-stoichiometric doped LZO as the La, Zr, and Ta source.
Figure 6C:
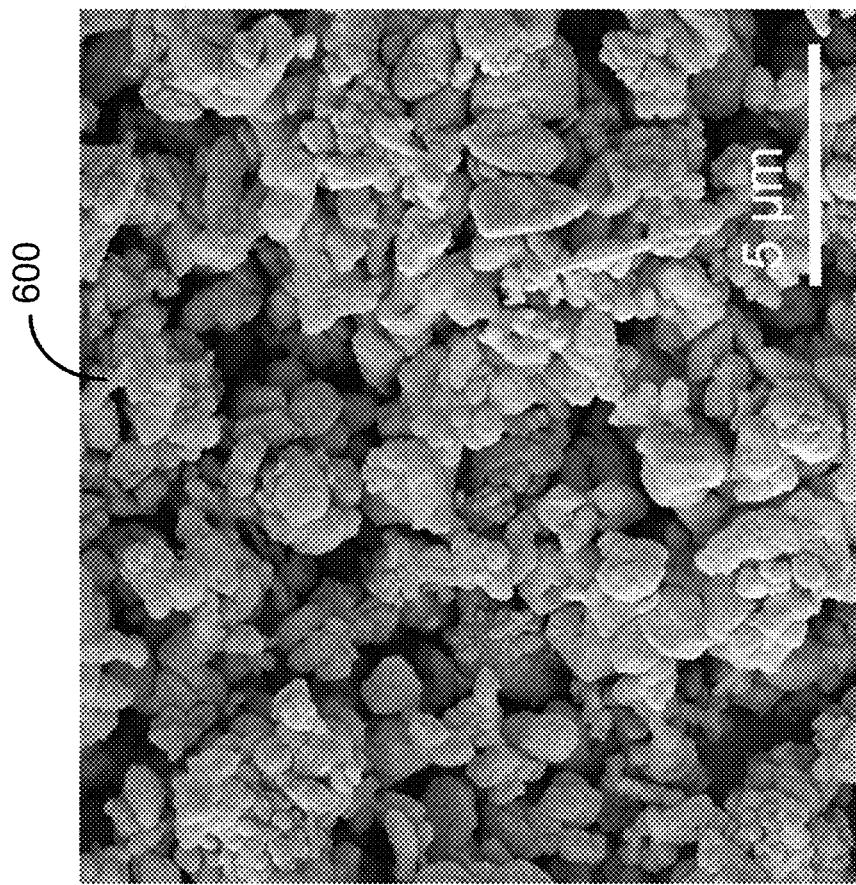

As an example, nanocrystals with nominal composition $La_{2.4}Zr_{1.12}Ta_{0.48}O_{7+x}$ (LZTO) where $x=0.04$ were used as precursors to prepare Ta-doped LLZO (LLZTO) with nominal composition $Li_{6.4}La_3Ta_{0.6}Zr_{1.4}O_{12}$. The nanocrystals were added to a molten salt flux consisting of 5 g of $LiNO_3$ and LiOH (1:1 mass ratio) with between 0.75-1.5 g of $Li_2O_2$ as additive to provide reactive oxygen species. Optionally, the LZTO nanocrystals can be ground together with an equal mass of anhydrous $LiNO_3$ to dilute them, de-agglomerate them, and help with mixing upon addition to the molten salt flux. Reaction temperature between 400-550° C. were studied, with the reaction time varied from 1-5 h. The products were washed with de-ionized water as described previously. XRD patterns of the formed products are shown in FIGS. 6A and 6B. The results show that the amount of $Li_2O_2$ added to the salt melt, the reaction temperature, and the reaction time play a role on the transformation of LZTO to LLZTO. As shown in FIG. 6A, when no $Li_2O_2$ was added, the product remained mostly LZTO after reaction at 400 and 500° C., Adding 1.5 g of $Li_2O_2$ was sufficient to form LLZTO after 5 h at 400° C., and only 1 h at 500 and 550° C. Other than some residual LiOH from the molten salt, no other crystalline impurity phases were observed. As shown in FIG. 6B, decreasing the amount of $Li_2O_2$ additive to 0.75 g required a longer reaction time of 3 h to transform the LZTO to LLZTO at 500 and 550° C. The $Li_2O_2$ likely plays an important role in providing reactive species for the reaction to proceed. Representative SEM and TEM images of LLZTO particles 600 and 602 formed using LZTO at 550° C. are shown in FIGS. 6C and 6D, respectively, showing that they have submicron diameters. These particles can be used to prepare thin films of LLZTO using tape-casting and other techniques described earlier. These results show that LZTO nanocrystal precursors can be successfully transformed to LLZTO after reaction with Li in a highly basic molten salt flux.

Figure 7A:
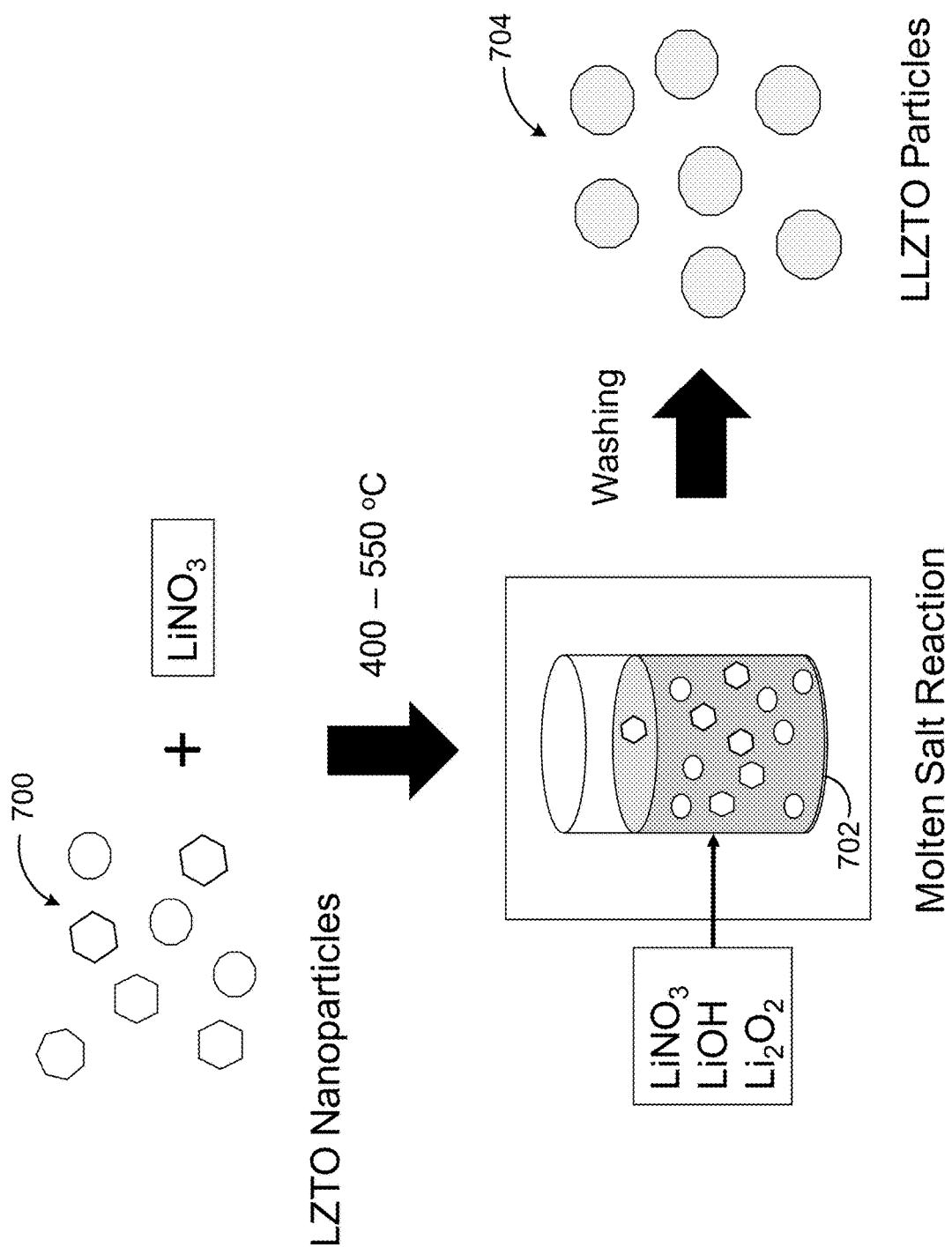
FIGS. 7A and 7B show schematics illustrating the formation of LLZTO particles from the reaction of LZTO nanocrystals in a molten salt reaction (NaOH:KOH eutectic) containing $Li_2O_2$. The LLZTO particles can then be processed into a slurry and fabricated into a thin film using tape-casting.
Figure 7B:
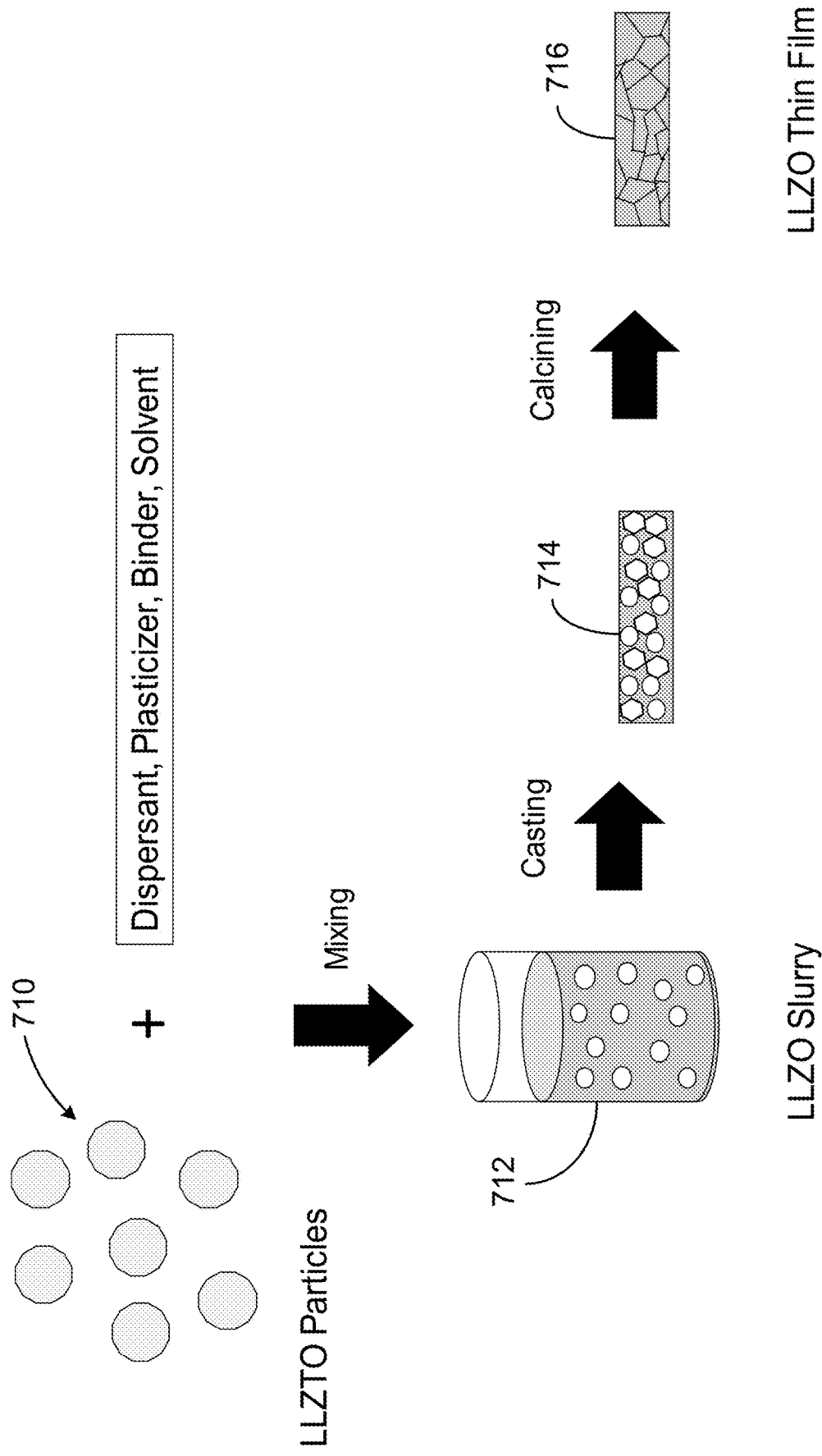

FIGS. 7A and 7B depict the formation of LLZTO powders from LZTO nanoparticles in the molten salt, followed by casting of the LLZTO powders into thin films. As depicted in FIG. 7A, LZTO nanoparticles 700 are added to a molten salt flux 702 including 5 g of $LiNO_3$ and LiOH (1:1 mass ratio) with between 0.75-1.5 g of $Li_2O_2$ as an additive to provide reactive oxygen species. Optionally, the LZTO nanocrystals can be ground together with an equal mass of anhydrous $LiNO_3$ to dilute them, de-agglomerate them, and help with mixing upon addition to the molten salt flux. Reaction temperatures between 400-550° C. and reaction times between 1-5 h can be used. The reaction mixture is washed to yield LLZTO particles 704. As depicted in FIG. 7B, LLZTO nanoparticles 710 are combined with a solvent and one or more of a dispersant, a plasticizer, and a binder to form slurry 712. Slurry 712 is cast to form a layer 714, and layer 714 is calcined to yield LLZO layer 716.

Figure 8:
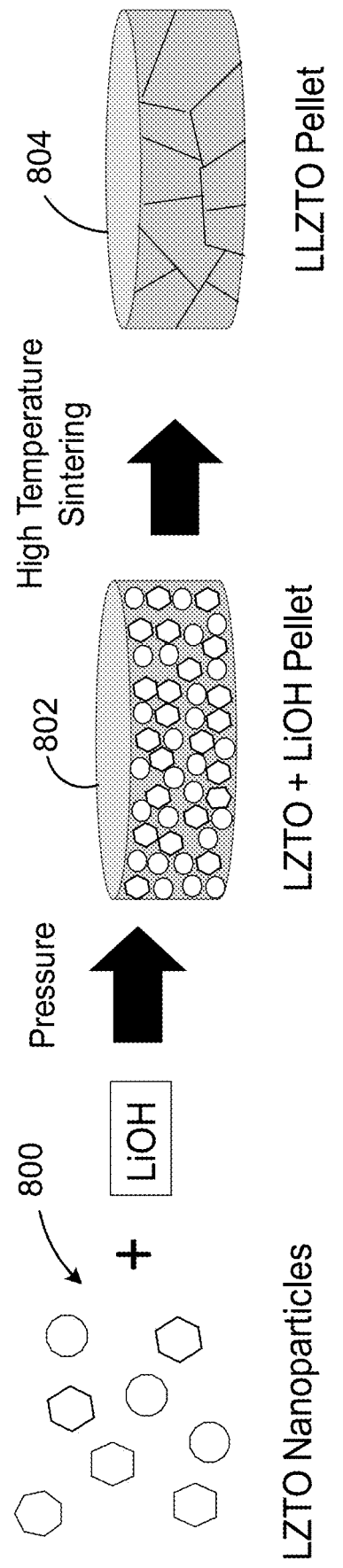
FIG. 8 shows a schematic illustrating the formation of a LLZTO pellet from LZTO nanocrystals by solid state reaction with a lithium source (e.g., LiOH) after high temperature sintering.
Figure 9A:
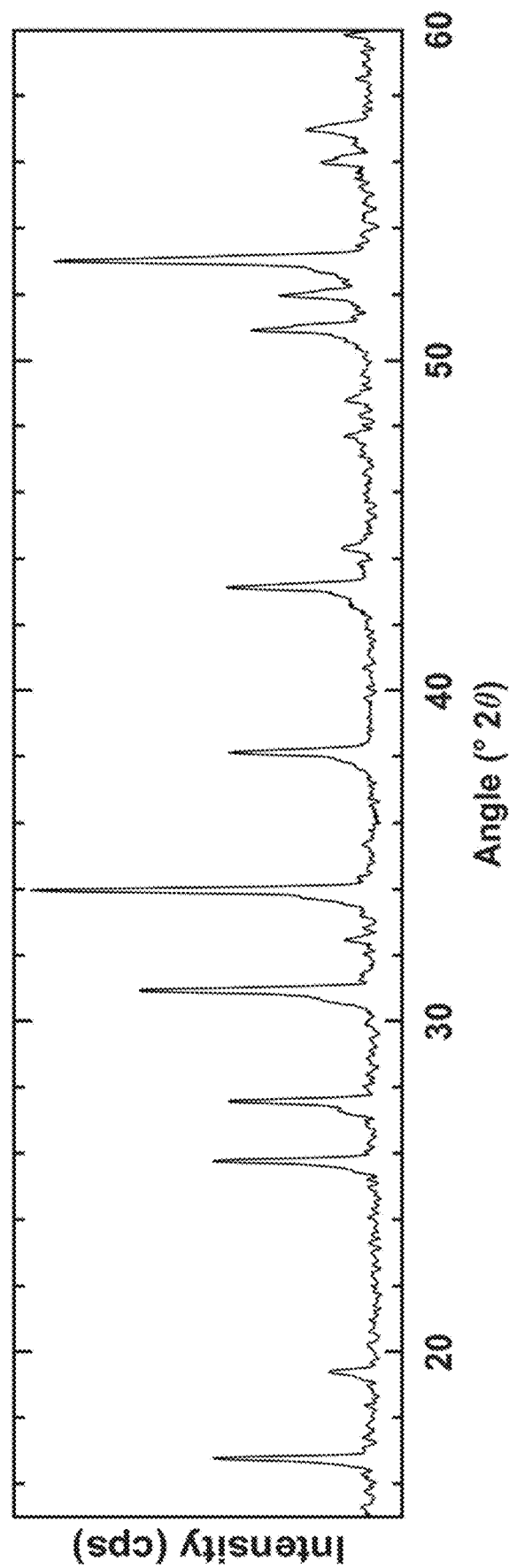
FIG. 9A shows a representative XRD pattern of LLZTO formed from sintering LZTO (nominal composition $La_{2.4}Zr_{1.12}Ta_{0.48}O_7$) nanocrystals with stoichiometric anhydrous LiOH (i.e., 6.4 moles LiOH to 3 moles La) with 5% excess and sintering at 1200° C.
Figure 9B:
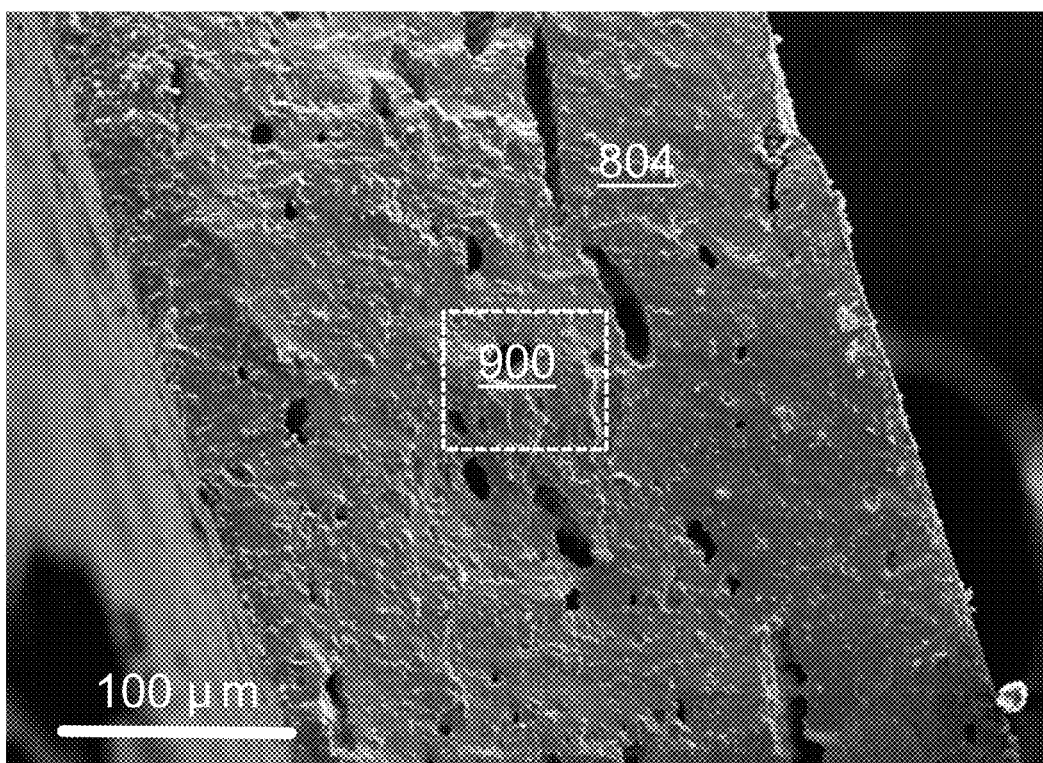
FIG. 9B shows a representative SEM image of the pellet fracture surface.
Figure 9C:
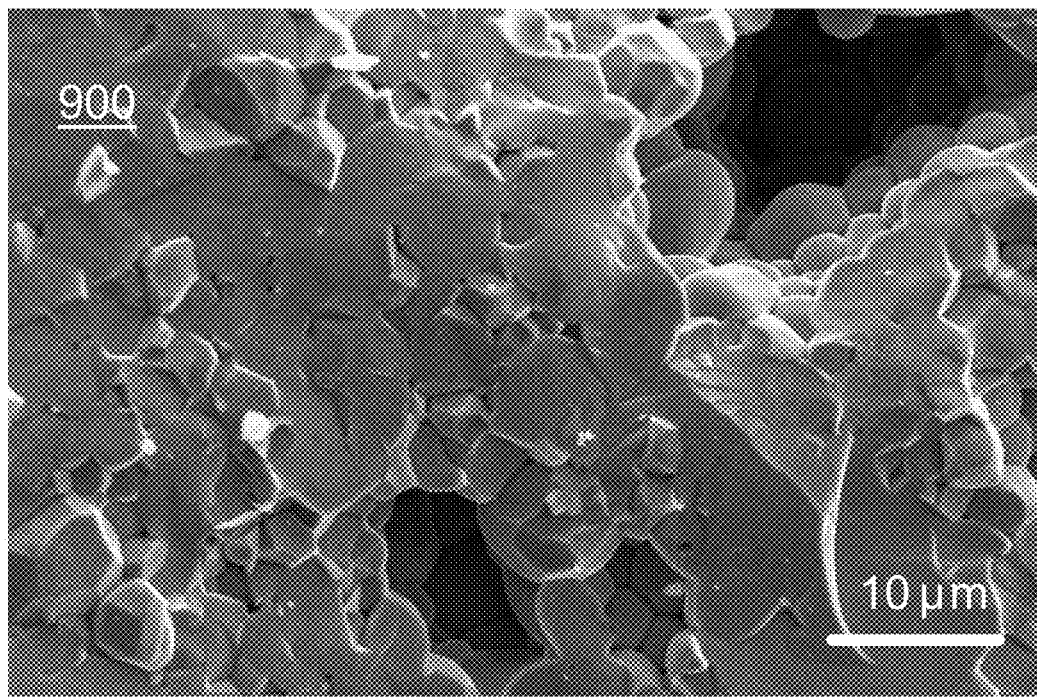
FIG. 9C shows an enlarged view of an identified region in FIG. 9B.

As another example, LZTO (nominal composition $La_{2.4}Zr_{1.12}Ta_{0.48}O_7$) nanocrystals were transformed to LLZTO by sintering with a lithium source (e.g. LiOH, $Li_2CO_3$, $Li_2O$) in the form of pellet. As depicted in FIG. 8, LZTO nanoparticles 800 are mixed with LiOH (e.g., stoichiometric anhydrous LiOH (i.e. 6.4 moles LiOH to 3 moles La) with 5% excess (by mass)) by slurry grinding in a mortar and pestle with water or methanol as the solvent followed by drying, and then pressed into pellets 804 (e.g., 7 mm pellets) and sintered to yield LLZTO pellets 806. Sintering may be achieved using a ramp rate of 4° C./min to the target temperature. After sintering at 1200° C. for 6 h, pellets with relative density of 79% were obtained. Sintering at 900° C. for 2 h, followed by 1200° C. for 4 h resulted in pellets with slightly higher relative density of 82%. Electrochemical impedance spectroscopy was performed at room temperature after applying graphite contacts to either side of the pellet. The Li ionic conductivity was 0.07 mS/cm for the pellet sintered at 1200° C. for 6 h, while the conductivity increased to 0.23 mS/cm for the pellet sintered with the lower temperature step. FIG. 9A shows an XRD pattern of pellet 804 sintered at 900° C. (2 h) then 1200° C. (4 h). FIG. 9B shows an SEM image of fracture surfaces of pellet 804, and FIG. 9C shows a magnified view of region 900 in FIG. 9B. The XRD pattern showed that the LZTO nanocrystals were successfully transformed to LLZTO without forming any secondary phases. The SEM images show that the pellet has a highly dense microstructure and displayed transgranular fracture; however, some large pores were still present which indicate that the sintering conditions need to be further optimized.

These results show that LZTO nanocrystals can serve as precursors to form LLZTO with good ionic conductivity after reaction with lithium. The transformation was successfully conducted in a lithium-containing molten salt flux at moderate temperatures (400-550° C.) as well as in a solid-state reaction with a lithium source using high temperature sintering (1200° C.). It is expected that this transformation will also be feasible in thin films such as those prepared by tape-casting from a slurry containing LZTO nanocrystals and a lithium source.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of synthesizing lithium lanthanum zirconate $Li_7La_3Zr_2O_{12}$, the method comprising:
    combining lanthanum zirconate $La_2Zr_2O_7$ nanocrystals comprising excess lanthanum with $LiNO_3$ to yield a first mixture;
    combining the first mixture with one or more salts of lithium to yield a second mixture;
    calcining the second mixture to yield a calcined mixture; and
    sintering the calcined mixture to yield the lithium lanthanum zirconate.

2. The method of claim 1, wherein the lanthanum zirconate nanocrystals further comprise a dopant.

3. The method of claim 1, wherein the one or more salts of lithium are molten.

4. The method of claim 3, wherein the one or more salts of lithium consist of $LiNO_3$ and LiOH.

5. The method of claim 4, wherein a mass ratio of $LiNO_3$ to LiOH is about 1:1.

6. The method of claim 3, wherein the one or more salts of lithium comprise a molten salt flux.

7. The method of claim 6, wherein the molten salt flux further comprises $Li_2O_2$.

8. The method of claim 6, wherein a temperature of the molten salt flux is between 400° C. and 550° C.

9. The method of claim 8, wherein the lanthanum zirconate and the one or more salts of lithium react in the molten salt flux for a length of time between 1 hour and 5 hours to yield the mixture.

10. The method of claim 1, wherein the mixture is a slurry.

* * * * *